United States Patent [19]
Albagli et al.

[11] Patent Number: 6,031,234
[45] Date of Patent: Feb. 29, 2000

[54] HIGH RESOLUTION RADIATION IMAGER

[75] Inventors: Douglas Albagli, Clifton Park; Robert Forrest Kwasnick; George Edward Possin, both of Niskayuna, all of N.Y.

[73] Assignee: General Electric Company, Schenectady, N.Y.

[21] Appl. No.: 08/986,534

[22] Filed: Dec. 8, 1997

[51] Int. Cl.$^7$ ........................................................ G01T 1/20
[52] U.S. Cl. ........................................ 250/370.11; 250/368
[58] Field of Search ................................ 250/370.11, 368

[56]  References Cited

U.S. PATENT DOCUMENTS

| | | |
|---|---|---|
| 3,944,835 | 3/1976 | Vosburgh . |
| 5,132,539 | 7/1992 | Kwasnick et al. . |
| 5,208,460 | 5/1993 | Rougeot et al. . |
| 5,241,180 | 8/1993 | Ishaque et al. . |
| 5,401,668 | 3/1995 | Kwasnick et al. . |
| 5,463,225 | 10/1995 | Kwasnick et al. . |
| 5,517,031 | 5/1996 | Wei et al. . |
| 5,585,280 | 12/1996 | Kwasnick et al. . |

FOREIGN PATENT DOCUMENTS 9614593  5/1996  WIPO .

OTHER PUBLICATIONS

European Search Report.

*Primary Examiner*—Constantine Hannaher
*Assistant Examiner*—Andrew Israel
*Attorney, Agent, or Firm*—Donald S. Ingraham; Douglas E. Stoner

[57]  ABSTRACT

A radiation imager includes a photosensor array that is coupled to a scintillator so as to detect optical photons generated when incident radiation is absorbed in the scintillator. The imager includes an optical crosstalk attenuator that is optically coupled to a first surface of the scintillator (that is, the surface opposite the photosensor). The optical crosstalk attenuator includes an optical absorption material that is disposed so as to inhibit reflection of optical photons incident on the scintillator first surface back into the scintillator along selected crosstalk reflection paths. The crosstalk reflection paths are those paths oriented such that optical photons passing along such paths would be incident upon photosensor array pixels that are outside of a selected focal area corresponding to the absorption point in the scintillator. The imager further may include an optical screen layer that is optically coupled to the scintillator second surface so as to be disposed between the scintillator and the photosensor array. The optical screen layer is made of a substantially transparent material selected to have a critical index of refraction so as to cause preferential reflection of optical photons that are incident on the screen layer to reduce optical crosstalk.

24 Claims, 5 Drawing Sheets

HIGH RESOLUTION RADIATION IMAGER

RELATED APPLICATIONS AND PATENTS

This invention was made with Government support under Government Contract No. MDA 972-94-30028 awarded by DARPA. The Government has certain rights in this invention.

TECHNICAL FIELD

This invention relates generally to solid state radiation imagers and in particular to improved spatial resolution in imagers having a scintillator coupled to a photosensor array.

BACKGROUND OF THE INVENTION

Solid state radiation imaging arrays typically comprise a photosensor array coupled to a scintillator. The radiation to be detected (e.g., x-rays or the like) penetrates the scintillator and is absorbed by the scintillator material in an event that results in the release of optical photons. The photosensor array coupled to the scintillator is used to detect the optical photons, providing a spatial location (x,y) in the array that corresponds with the point in the scintillator at which the incident radiation was absorbed. Readout of the photosensor array allows electrical signals to be generated that correspond to the pattern of absorbed radiation. The data embodied in such electrical signals can be presented in a visual display or otherwise processed to allow analysis of the radiation pattern.

Good spatial resolution in an imager necessitates that the optical photons generated in an absorption event be detected by a photosensor in the immediate vicinity of the absorption event so that the electrical signal representing the absorbed radiation originates from a sensor in the array near the absorption event. Photons generated in the absorption event, however, are emitted in all directions and will readily travel through the scintillator material, which typically is substantially optically transparent. The multi-directional emission of optical photons from an absorption event results in approximately half of the photons moving in a direction away from the photosensor array; these photons are not only not directly detected by the photosensor array but also can be reflected off the surface of the scintillator opposite the photosensor array along paths that cause them to strike the photosensor array at a point away from the spatial location (x,y) of the absorption event, thus degrading the spatial resolution and image quality provided by the imager.

Reduction of optical crosstalk, that is, optical photons that are incident on the photosensor array at a point distant from the spatial location (x,y) of the absorption event, is desirable to improve spatial resolution and image quality.

SUMMARY OF THE INVENTION

A radiation imager includes a photosensor array that is coupled to a scintillator so as to detect optical photons generated when incident radiation is absorbed in the scintillator. In accordance with this invention, the imager includes an optical crosstalk attenuator that is optically coupled to a first surface of the scintillator (that is, the surface opposite the photosensor array). The optical crosstalk attenuator includes an optical absorption material that is disposed so as to inhibit reflection of optical photons incident on the scintillator first surface back into the scintillator along selected crosstalk reflection paths. The crosstalk reflection paths are those paths oriented such that optical photons passing along such paths would be incident upon photosensor array pixels that are outside of a focal area corresponding to the absorption point in the scintillator.

In accordance with the present invention, the imager further may include an optical screen layer that is optically coupled to the scintillator second surface so as to be disposed between the scintillator and the photosensor array. The optical screen layer comprises a substantially transparent material having a critical index of refraction so as to cause preferential reflection of optical photons that are incident on the screen layer at an angle that would result in optical crosstalk, typically greater than a scintillator critical angle determined by the scintillator material and structure.

DETAILED DESCRIPTION OF THE INVENTION

Figure 1:
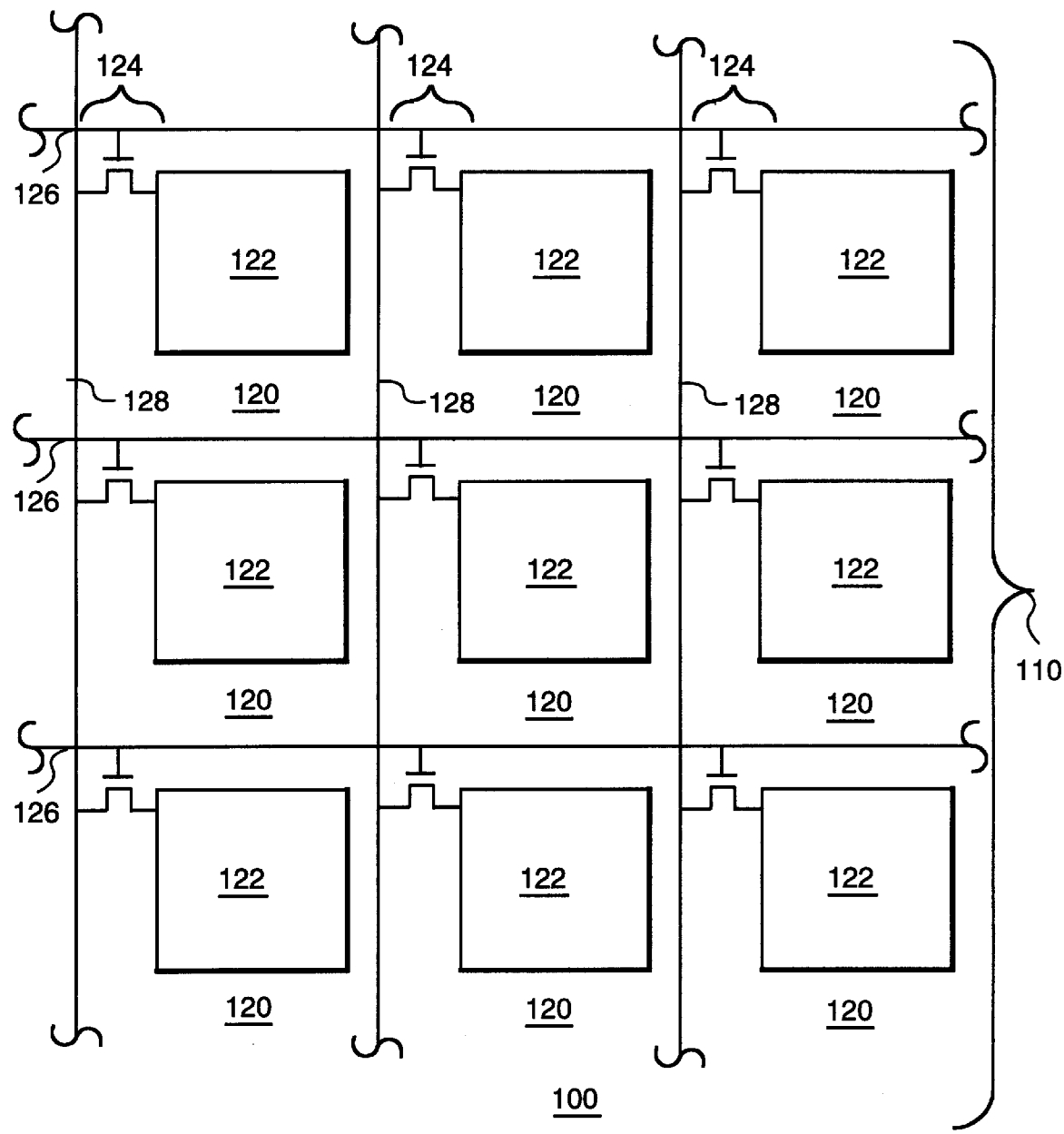
FIG. 1 is a schematic representation of a radiation imager photosensor array

A solid state radiation imager 100 typically comprises a photosensor array 110 having a plurality of pixels 120 disposed in rows and columns, as illustrated in FIG. 1. Photosensor array 110 is optically coupled to a scintillator 150 (FIG. 2) that is disposed over the photosensor array. In operation, imager 100 is positioned so that radiation to be imaged, for example x-rays and the like, is incident on scintillator 150, which typically comprises a material such as cesium iodide or the like. Incident radiation typically enters scintillator 150 across a first surface 160 and is absorbed in the scintillator material in an event resulting in the generation of optical photons. Detection by photosensor array 110 of the optical photons emitted when the incident radiation is absorbed by the scintillator material enables the generation of an electrical signal corresponding to the pattern of the incident radiation.

In photosensor array 110, each pixel 120 comprises a photosensor 122, such as a photodiode, that is coupled via a switching device 124 to address lines 126, 128. The switching device 124 typically comprises a thin film field effect transistor ("TFT" or "FET"); commonly address line 126 is referred to as a scan line and is coupled to the respective gate electrodes of TFTs 124 in pixels disposed along a row in photosensor array 110. A signal applied to a scan line causes TFT 124 to become conductive, thereby allowing an electrical signal on photosensor 122 to be read out from address line 128, commonly referred to as a data line.

Figure 2:
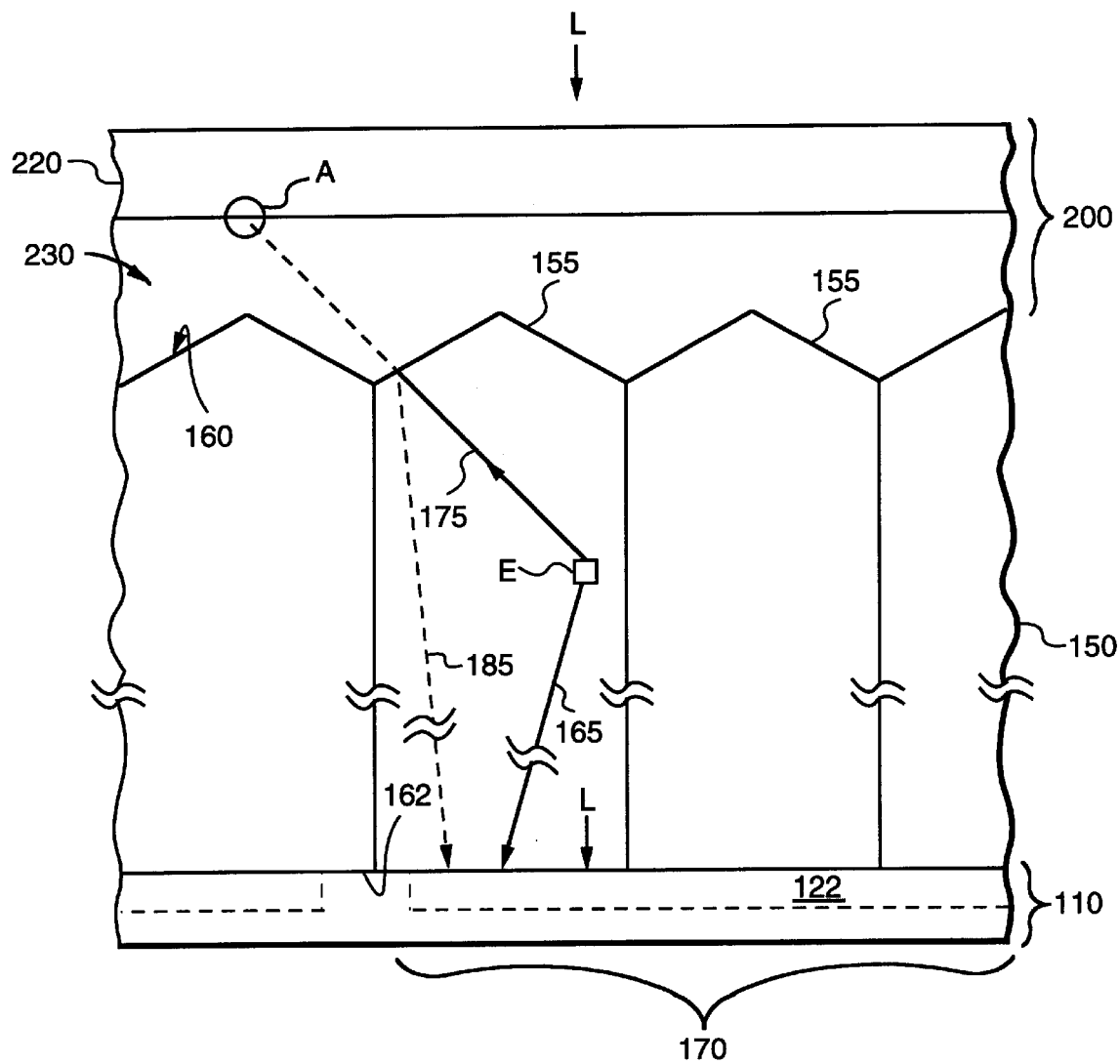
FIG. 2 is a cross-sectional view of a portion of a radiation imager in accordance with one embodiment of the present invention.

Optimally, all optical photons generated from the absorption of a photon of incident radiation are detected by pixel 120 in photosensor array 110 that corresponds most closely with the spatial (x,y) location of the emission location (illustrated as "E" in FIG. 2). As used herein, spatial location corresponds to the location "L" (FIG. 2) that has coordinates (x,y) in the plane of photosensor array 110 (for purposes of reference, and not limitation, the orientation of imager 100 is referred to in this document in the horizontal plane), regardless of the distance that the incident radiation photon has penetrated through the thickness of scintillator 150 prior to absorption (e.g., in the plane orthogonal to the horizontal plane, referred to as the vertical plane).

As the material comprising scintillator 150 is substantially optically transparent (at the wavelength of the generated photons), optical crosstalk can degrade spatial resolution of the imager. As used herein, "optical crosstalk" refers to optical photons generated in an absorption event at a given spatial location (x, y) in the scintillator being detected by a photosensor array pixel other than the pixel in closest proximity to the spatial location of the absorption event. "Spatial resolution" and the like refers to the ability of the imager to produce an electrical signal that accurately corresponds with the spatial pattern of incident radiation (one of the significant determinants of the accuracy of the signal is the detection of optical photons by primarily the photosensor pixel in closest proximity to the absorption event).

In accordance with the present invention, imager 100 further comprises an optical crosstalk attenuator 200 that is disposed over a first surface 160 of scintillator 150. As used herein, "over", "above", "under" and the like are used to refer to the relative location of elements of imager 100 as illustrated in the Figures and is not meant to be a limitation in any manner with respect to the orientation or operation of imager 100. Optical crosstalk attenuator 200 is optically coupled to scintillator 150 (that is, disposed in a position so that optical photons passing upwards out of scintillator 150 across first surface 160 will be incident on crosstalk attenuator 200) so as to inhibit reflection of optical photons incident off of scintillator first surface 160 back into scintillator 150 along crosstalk reflection paths 185, as described more fully below. In FIG. 2, optical crosstalk 200 is illustrated with a backing plate 220; this representation is provided by way of illustration and not limitation with respect to the various embodiments of crosstalk attenuator 200 set forth below.

By way of example and not limitation, as shown in FIG. 2, incident radiation absorbed in scintillator 150 results in emission of optical photons at position "E." Optical photons emanate from position "E" in all directions; desirably, optical photons emanating from position "E" are detected within a focal area 170 that corresponds to the dimensions of pixel photosensor active area 122 disposed in closest proximity to the spatial location "L" of the absorption location "E" of the incident radiation (e.g., in FIG. 2, "L" is illustrated directly under the location of absorption event "E"). For example, optical photons passing along direct paths 165 will be incident on pixel 120 in focal area 170. Optical photons passing along exemplary indirect paths 175, however, are incident upon scintillator first surface 160. In the absence of crosstalk attenuator 200, such photons commonly would be reflected from surface 160 along illustrative crosstalk reflection paths 185. Crosstalk reflection paths 185 refer to paths on which optical photons are reflected from scintillator first surface 160 and that are oriented such that the photons would be incident on portions of photosensor array 110 outside of focal area 170.

Figure 3:
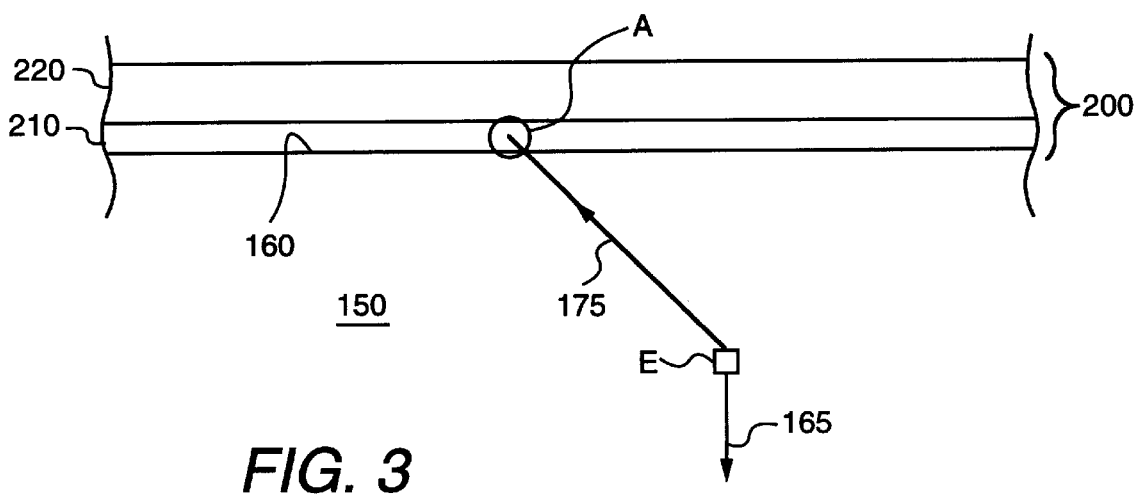
FIG. 3 is a cross-sectional view of a portion of a radiation imager in accordance with another embodiment of the present invention.

One embodiment of optical crosstalk attenuator 200 for use with a scintillator with a smooth first surface 160 is illustrated in FIG. 3. In this embodiment, scintillator first surface 160 is smooth, such as a polished surface, typically having a surface roughness much less than the wavelength of the incident light (e.g., less than about and order of magnitude of the wavelength $\lambda$ (e.g., $\lambda/10$)). For such a scintillator arrangement, optical crosstalk attenuator 200 typically comprises an optical absorption material 210 disposed on a backing member 220, with attenuator 200 being disposed over scintillator 150 such that absorption material 210 faces scintillator first surface 160. Optical absorption material 210 typically has an optical transmittance in the range between about 25% and about less than 1%. Additionally, optical absorption material desirably exhibits a low absorption cross-section for the type of incident radiation to be imaged by imager 100; for example, for x-ray imaging, it is desirable that materials disposed above scintillator first surface absorb less than a few percent of the incident x-ray beam. By way of example, and not limitation, such absorption material 210 comprises a flat black paint that is disposed as an overcoat on backing member 220 with a thickness in the range between about 10 $\mu$m and about 1 $\mu$m. Backing member 220 desirably also exhibits a low absorption cross section for the radiation being imaged, as noted above. Backing member 220 commonly comprises a thin polyester sheet (or alternatively, a graphite or plastic plate) having a thickness in the range between about 1 mm and about 5 $\mu$m. Optical photons incident on crosstalk attenuator 200 typically are absorbed (e.g., at location "A" in FIG. 3), precluding the photon being reflected back down into the scintillator along a crosstalk path 185.

Scintillator 150 used in imager 100 may alternatively have a needle-like structure, with the needles being oriented in the vertical plane, extending from a scintillator second surface 162 (which surface is disposed facing photosensor array 110) towards scintillator first surface 160. Such a scintillator structure is formed by control of the deposition process of the scintillator material (e.g., CsI) over photosensor array 110. This needle-like structure serves to localize optical photons generated when incident radiation is absorbed; spatial localization is provided because some fraction of the optical photons generated will undergo total internal reflection within the needle so that they exit scintillator second surface within the desired focal area 170. Typically such needle formations have an approximate diameter in the range of about 1 $\mu$m to about 10 $\mu$m; consequently, a plurality of needle structures are disposed over any one pixel 120 in photosensor array 110 (the lateral dimensions of a pixel in such arrays are typically in the range between about 30 $\mu$m and about 1 mm).

A needle-like scintillator structure 200 (FIG. 2) has a scintillator first surface 160 comprising a plurality of columnar protrusions 155. First surface 160 has an uneven (or textured) finish, which is not polished in order to maintain the integrity of respective needle-like structures in scintillator 150. In accordance with the present invention, especially for use with scintillator having protrusions 155 on first surface 160, optical crosstalk attenuator 200 further comprises an optical coupling layer 230 that is disposed between scintillator first surface 160 and optical absorption material 210. Optical coupling material 230 typically comprises a material such as a pressure sensitive adhesive (PSA) (e.g., PSA part number V320 of FLEXcon Co. of Spencer, Mass.)

that is relatively optically transparent (e.g., having an optical transmittance in the range between about 50% and about 100%). Desirably, standard water-based PSA used for optical coupling material exhibits an index of refraction that corresponds to the optical index of refraction of the scintillator material (e.g., has an index of refraction having a value within ±20% of the value of the index of refraction of the scintillator). Due to the effects of total internal reflection, it is preferable for the coupling material to have an index of refraction greater than the index of refraction of the scintillator, although materials with lower indices of refraction will also provide acceptable performance. For example, CsI exhibits an index of refraction of about 1.79; effective optical coupling materials for use with CsI desirably have respective indices of refraction in the range between about 1.79 and about 2.15; materials with and index of refraction in the range between about 1.79 and 1.43 are also acceptable.

Figure 4:
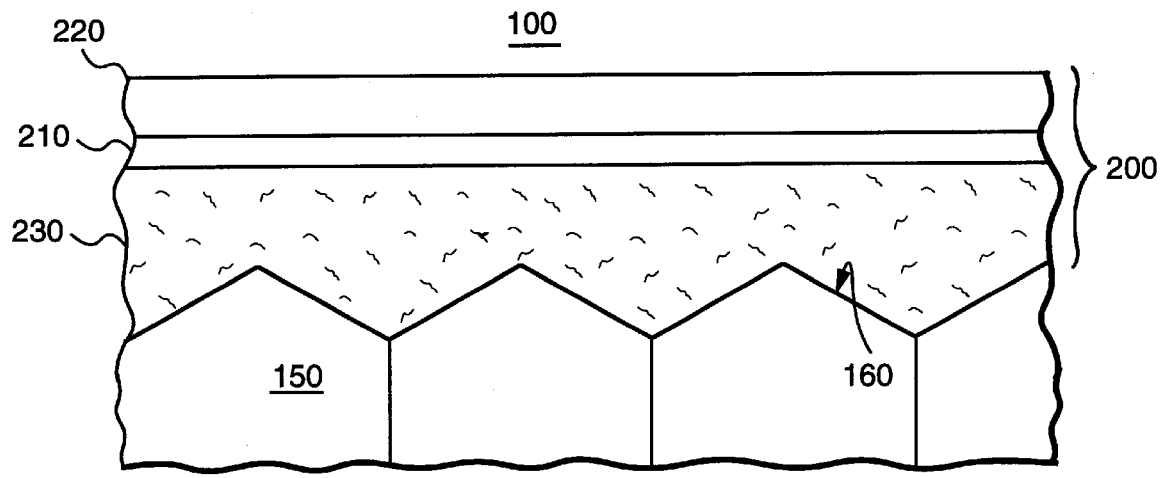
FIG. 4 is a cross-sectional view of a portion of a radiation imager in accordance with a further embodiment of the present invention.

Optical coupling material 230 additionally desirably has a viscosity such that when it is disposed over the textured scintillator first surface 160 it is viscous enough to be displaced so as to be in intimate contact with all surfaces of columnar protrusions 155. As used herein, "intimate contact" and the like refers to material being disposed adjacent to scintillator first surface 160 so that optical photons pass directly from scintillator first surface 160 into the optical coupling material (without passing through intermediate air pockets) over an area greater than about 50% of said first surface. Optical coupling layer 230 typically has a thickness in the range between about 10 μm and about 1 mm In a further embodiment of the present invention as illustrated in FIG. 4, an optical absorption material is mixed into optical coupling layer 230 (as illustrated by speckling in coupling layer 230 in FIG. 4). The addition of optical absorption material, such as fine carbon powder, to optical coupling layer 230 causes coupling layer 230 to become another absorbing layer, typically exhibiting a "single pass" optical transmittance in the range between about 40% and about less than 1% (to reenter the scintillator in the event of reflection off of absorption material 210, optical photons would need to pass two times through the absorbing optical coupling layer 230; thus even a material with a transmittance as high as 40% assures that less than 16% of the light would reenter the scintillator). One example of such an absorbing coupling layer 230 comprises fine carbon dust (e.g., a particle size in the range between less than about 1 μm and about 10 μm) mixed with adhesive material.

Figure 5:
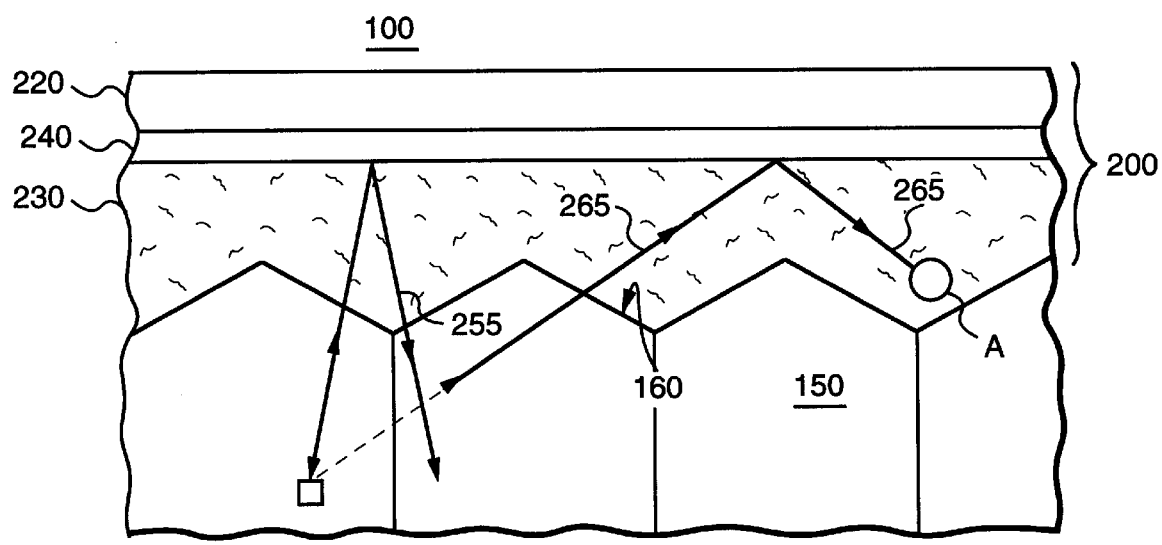
FIG. 5 is a cross-sectional view of a portion of a radiation imager in accordance with a still further embodiment of the present invention.

A still further embodiment of an optical crosstalk attenuator 200 in accordance with the present invention is illustrated in FIG. 5 and comprises a optical coupling layer 230 that is weakly absorbing and an optical reflecting layer 240 disposed over the weakly absorbing coupling layer 230. As used herein, "weakly absorbing" refers to an optical transmittance in the range between about 90% and about 40%. It is to be noted that these transmittance figures represent transmittance for one pass through optical coupling layer; as described herein, in the present embodiment and optical photon leaving scintillator first surface 160 would pass twice through coupling layer 230 before re-entering scintillator 200 across scintillator first surface 160. In this arrangement, optical photons emanating from incident radiation absorption location "E" that are incident on scintillator first surface 160 will typically pass into weakly absorbing coupling layer 230. Those photons that enter at angles that result in relatively short paths (illustrated as path 255 in FIG. 5) through weakly absorbing optical coupling layer 230 will strike reflecting layer 240 and reflect along paths that typically will result in the reflected photon being incident on photosensor array 110 within the desired focal area 170 (FIG. 2). Conversely, photons entering weakly absorbing coupling layer along optical crosstalk paths 265 (FIG. 5) will pass a greater distance through the weakly absorbing optical coupling layer and thus are more likely to be absorbed in layer 230 before re-entering scintillator 150. Adjustment of the optical transmittance of coupling layer 230 (such as by changing the concentration (e.g., during fabrication) of optical absorbing material in coupling layer 230) enables the "tuning" of optical crosstalk attenuator to provide a desired spatial resolution (e.g., reduction of optical crosstalk) while still capturing some number of the optical photons that are emitted along paths towards scintillator first surface 160. Alternatively, the reflectivity of reflective layer 240 can also be adjusted in fabrication to provide a desired tuning effect for optical crosstalk attenuator 200.

Placement of optical crosstalk attenuator over scintillator first surface 160 in an imager provides a desirable improvement in imager performance. For example, as is known in the art, one measure of imager performance is the modulation transfer function ("MTF"). By way of example and not limitation, the following information provides a comparison of 1) an imager having a reflective film (alone) in intimate contact with scintillator first surface 160; 2) a smooth piece of graphite (gray in color) placed above (e.g., about 200 μm) scintillator first surface 160; and 3) an optical crosstalk attenuator in accordance with the present invention comprising a clear optical coupling layer with an optical absorption layer thereover (black polyester substrate with a clear pressure sensitive adhesive (PSA) disposed over scintillator first surface 160). MTF's for the three imager arrangements were measured (at the spatial frequency of 2.5 lp/mm) and are summarized below:

| Scintillator Surface Covering | MTF | Relative Improvement |
| --- | --- | --- |
| Highly reflective | 0.2 | 0% |
| Gray graphite/air gap | 0.241 | 20% |
| Black with clear PSA | 0.314 | 57% |

The optical crosstalk attenuator in accordance with this invention provides improved imager performance and serves to reduce the number of optical photons that reflect off scintillator first surface 160 and propagate through the scintillator along crosstalk reflection paths.

Performance of imager 100 can be further enhanced in accordance with this invention with an optical screen layer 300 optically coupled to scintillator second surface 162 (FIGS. 6 and 7) that is disposed facing photosensor array 110 (that is, is disposed opposite scintillator first surface 160). Optical screen layer 300 comprises a substantially transparent material (e.g., having an optical transmittance greater than about 80%); screen layer 300 material is further selected to have an index of refraction that is less than that of the scintillator material. This lower value of the index of refraction for the screen layer 300 with respect to the value of the index of refraction of the scintillator material results in some portion of the optical photons that are incident on said screen layer from the scintillator second surface being reflected back into scintillator 150. The lower the value of the index of refraction with respect to scintillator 150, the greater the proportion of incident optical photons that will be reflected back into scintillator 150 (that is, the optical photons undergo total internal reflection in the scintillator). Selection of a material for screen layer 300 having a particular index of refraction thus enables one to "tune" the proportion of internal reflection; such tuning enables design choices to be made between anticipated MTF increases (resulting from reduced optical crosstalk) and corresponding signal level decreases (e.g., reduced numbers of optical photons reaching the photosensor array).

Use of screen layer 300 for "tuning" an imager as described above is particularly applicable when a scintillator material such as cesium iodide is used. The tuning process is refined through selection of a screen layer having a critical index of refraction to provide reflection of optical photons striking screen layer 300 at an angle greater than a scintillator critical angle so as to provide reasonably precise demarcation of photons that will be reflected as undesirable crosstalk light and photons that will be able to pass through screen layer 300 into photosensor array 110. As used herein, "critical index of refraction" and the like refers to a value of screen layer's index of refraction that is less than the value of the scintillator index of refraction by an amount that results in reflection of incident photons striking the screen layer at an angle greater than a scintillator critical angle. "Scintillator critical angle" and the like refers to the angle of incidence for photons passing from scintillator second surface at which reflection will occur off of screen layer 300 back towards scintillator 150. The scintillator critical angle has a value that is selected to reduce optical crosstalk in the scintillator as described more fully below.

In an imager having a cesium iodide scintillator, optical screen layer 300 typically comprises silicon oxide, a material that provides desirable optical transparence (e.g., <1% absorption), is readily uniformly deposited in the fabrication process (e.g., in a plasma enhanced chemical vapor deposition (PEQVD) process), and exhibits an optical index of refraction of about 1.5 that provides a desired scintillator critical angle for reflecting photons passing from scintillator second surface. Alternatively, materials such as magnesium fluoride ($MgF_2$), and polyimide can be used as appropriate to provide different scintillator critical angles. Optical screen layer 300 typically has a thickness sufficient to produce significant reflection (e.g., reflection of about 50% or more optical photons incident at angle equal to or greater than the scintillator critical angle) while being thin enough to prevent spatial resolution degradation (e.g., due to the lateral spread of light). Common thicknesses for optical screen layer 300 comprising silicon oxide are in the range between about 25 nm and about 5 $\mu$m.

In accordance with this invention, optical screen layer 300 can be effectively used with any scintillator structure. Screen layer 300, however, is particularly effective when used with scintillators that are not highly scattering, such as a scintillator that has a plurality of columnar protrusions (or needles) 152 from the scintillator surface (illustrated in FIG. 6 as parallel lines in the vertical plane within scintillator 150). Columnar protrusions 152 serve to isolate a portion of the optical photons emanating from the location "E" of an absorption event. The long thin needle-shaped structure of columnar protrusion 152 (e.g., having a diameter in the range between about 5 $\mu$m and about 10 $\mu$m, and a length in the range between about 50 $\mu$m and 1000 $\mu$m) serves to trap virtually all light that is emitted at an angle greater than a critical angle determined by the interface between the CsI column 152 and the material surrounding the column. For example, if air surrounds the column, the critical angle is about 34 degrees; thus all light photons striking the column sidewall at or greater than an angle of incidence of 34 degree will undergo total internal reflection within the needle column. As illustrated by pathway "T" in FIG. 6, this light will pass though columns 152 and strike scintillator second surface 162 at an angle between about zero degrees (perpendicular to the surface) and about 56 degrees (with respect to the normal). As this light accurately represents the spatial (x,y) location of the absorption event, it is desirable that these optical photons pass through screen layer 300 to photosensor array 110.

Figure 8:
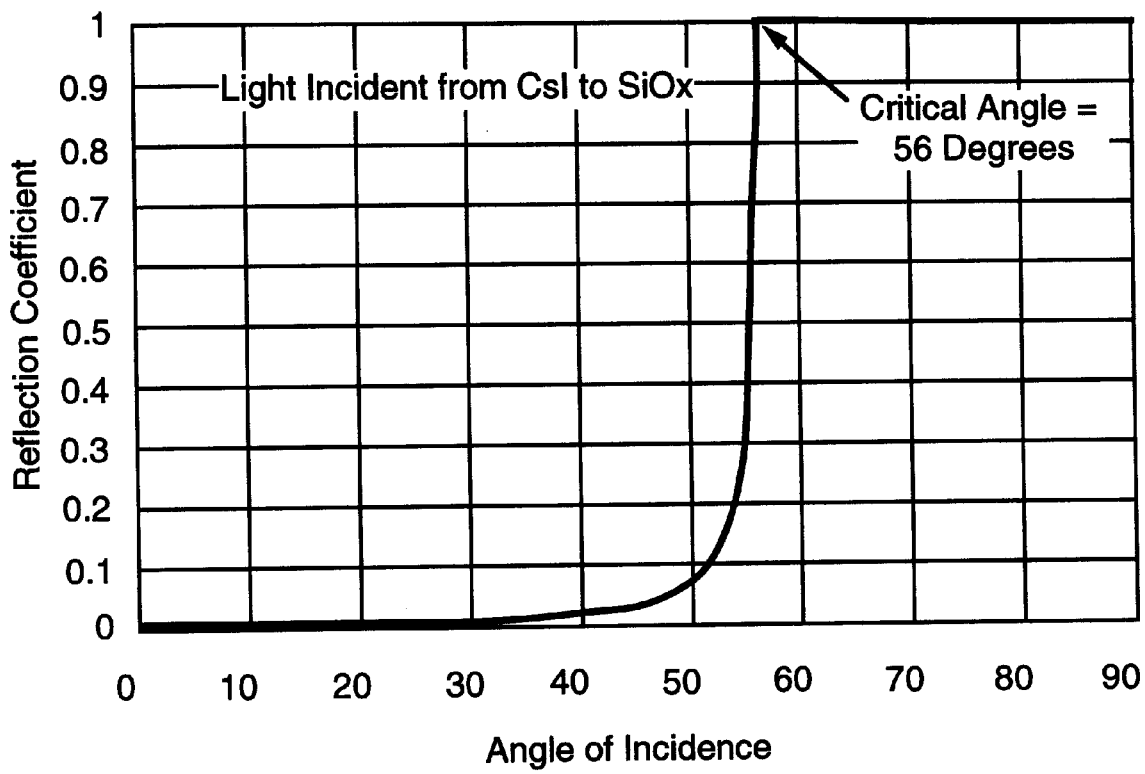
FIG. 8 is a graphical representation of reflection coefficient as a function of angle of incidence of light passing between cesium iodide and silicon oxide.

Optical photons that strike the sidewall of columnar protrusion 152 at an angle less than the critical angle will pass outside of columnar protrusion 152. As noted above, the critical angle is about 34 degrees for scintillator needles comprising cesium iodide (index of refraction 1.79) surrounded by an air gap (index of refraction 1.00). Photons passing from columnar protrusion 152 that strike scintillator second surface 162 thus will have an angle of incidence of 56 degrees or greater (the "scintillator critical angle", denoted as "CA" in FIG. 6), with the scintillator critical angle being measured from the normal of second scintillator surface 162 to the path of incident photon. FIG. 8 illustrates graphically the effective reflection coefficient of the CsI to optical screen interface (for SiOx), indicating the scintillator critical angle occurring at 56 degrees, at which nearly total reflection occurs. Optical screen 300 comprises a material having a critical index of refraction, that is, an index of refraction that will cause reflection of photons striking the optical screen at the scintillator critical angle. Thus, substantially all photons escaping from columnar protrusion 152 and which pass from scintillator second surface 162 will be reflected by optical screen 300 back into scintillator 150.

Optical screen 300 is commonly disposed immediately adjacent to scintillator second surface 162 (that is, no intervening material layers). Alternatively, optical screen 300 is optically coupled to scintillator second surface 162 via intervening layers 50 (FIG. 7) of material, such as silicon nitride (SiN) (typically having an index of refraction between about 1.9 and 2.0) that are, for example, disposed adjacent to scintillator 150 to provide environmental protection to the scintillator material. As long as such intermediate layers have an index of refraction greater than that of CsI (e.g., about 1.84 to about 2.1), the presence of such intervening layers does not adversely affect the ability of optical screen to reflect optical photons leaving scintillator second surface 162 at the scintillator critical angle (or angles less than the scintillator critical angle).

Figure 6:
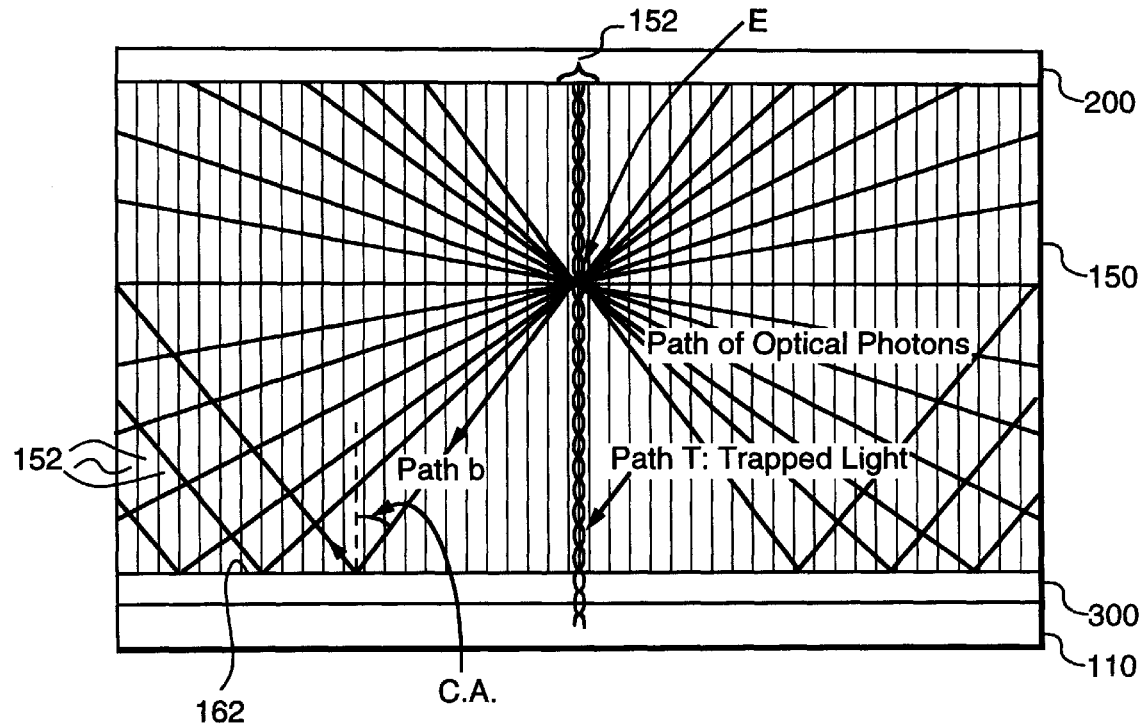
FIG. 6 is a cross-sectional view of a portion of a radiation imager in accordance with an embodiment of the present invention, which figure illustrates various reflection angles of light within the imager.
Figure 7:
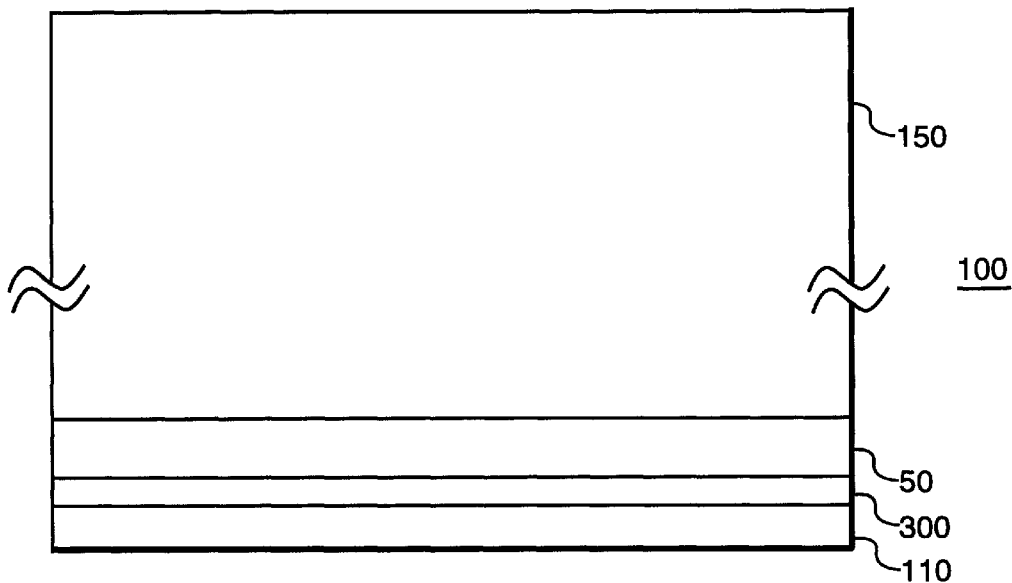
FIG. 7 is a cross sectional view of a portion of a radiation imager in accordance with another embodiment of the present invention.

Imager 100 beneficially, but not necessarily, comprises both optical crosstalk attenuator 200 and optical screen layer 300, as illustrated in FIG. 6.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A radiation imager for converting incident radiation into an electrical signal corresponding to said incident radiation, the imager comprising:

a scintillator having a first surface and a second surface;

a photosensor array comprising a plurality of pixels optically coupled to said second surface of said scintillator; and an optical crosstalk attenuator optically coupled to said scintillator first surface, said crosstalk attenuator comprising at least an optical absorption material disposed so as to inhibit reflection of optical photons incident on said scintillator first surface back into said scintillator along crosstalk reflection paths, said crosstalk reflection paths being oriented such that photons passing thereon would be incident upon said photosensor array outside of a focal area spatially corresponding to the absorption point in said scintillator of said incident radiation.

2. The imager of claim 1 wherein said optical crosstalk attenuator comprises a backing member having said optical absorption material disposed on at least one surface thereof;

said backing member being disposed over said scintillator such that said optical absorption material is disposed facing said scintillator first surface.

3. The imager of claim 2 wherein said backing member comprises a material selected from the group consisting of polyester sheet, graphite and plastic, and said optical absorption material comprises a black overcoat material disposed on said backing member.

4. The imager of claim 3 wherein said scintillator first surface is substantially smooth, and said backing member is disposed immediately adjacent said scintillator first surface.

5. The imager of claim 2 further comprising an optical coupling layer disposed between said scintillator first surface and said optical absorption layer on said backing member.

6. The imager of claim 5 wherein said scintillator first surface comprises a plurality of columnar protrusions extending from said scintillator so as to present a textured surface, and said optical coupling layer is disposed in intimate contact with said scintillator textured surface so as to be disposed around said protrusions.

7. The imager of claim 6 wherein said optical coupling layer comprises a material having an optical index having a value within ±20% of the value of the optical index of said scintillator.

8. The imager of claim 7 wherein said optical coupling layer has a transmittance in the range between about 50% and about 100%.

9. The imager of claim 5 wherein said optical coupling layer further comprises an optically absorptive material such that said coupling layer has an optical transmittance less than about 20%.

10. The imager of claim 1 wherein said scintillator first surface comprises a plurality of protrusions extending from the remaining portions of said scintillator so as to present a textured surface, and said optical crosstalk attenuator further comprises:

an optical coupling layer disposed over said scintillator textured surface so as to be disposed around said protrusions;

an optical reflecting layer disposed over said optical coupling layer on a surface of said coupling layer opposite the surface in intimate contact with said scintillator first surface;

said optical coupling layer having an optical index of refraction having a value within ±20% of the value of the optical index of said scintillator;

said optical coupling layer further having a transmittance within a tuned absorption range to provide preferential absorption of optical photons reflecting from said optical reflecting layer at an angle greater than a selected crosstalk reduction angle compared with optical photons reflecting from said optical reflecting layer at an angle less than said selected optical crosstalk reduction angle.

11. A radiation imager for converting incident radiation into an electrical signal corresponding to said incident radiation, the imager comprising:

a scintillator having a first surface and a second surface;

a photosensor array comprising a plurality of pixels optically coupled to said second surface of said scintillator; and an optical screen layer optically coupled to said scintillator second surface, said optical screen layer comprising a substantially transparent material having a critical index of refraction selected so as to cause preferential internal reflection of optical photons incident to reduce optical crosstalk in said radiation imager.

12. The imager of claim 11 wherein said scintillator comprises cesium iodide, and said optical screen layer is selected from the group consisting of silicon oxide, magnesium fluoride and polyimide.

13. The imager of claim 12 wherein said scintillator first surface comprises a plurality of columnar protrusions having an index of refraction of about 1.8 and said optical screen layer comprises a material having a respective index of refraction such that optical photons undergoing total internal reflection within one of said columnar protrusions passes from said scintillator at an angle in the range between about zero degrees and about 56 degrees with respect to the normal of said scintillator second surface.

14. The imager of claim 13 wherein said imager has a scintillator critical angle of about 56 degrees, and said critical optical index of refraction of said screen layer is about 1.48 so as to cause total internal reflection within said screen layer of substantially all optical photons incident on said optical screen layer at an angle greater than said scintillator critical angle.

15. The imager of claim 11 wherein said optical screen layer has a thickness in the range between about 50 nm and about 5 µm.

16. The imager of claim 11 wherein said optical screen layer is disposed immediately adjacent said scintillator second surface.

17. The imager of claim 11 wherein at least one intermediate material layer is disposed between said optical screen layer and said scintillator second surface.

18. The radiation imager of claim 11 wherein said optical screen index of refraction has a value less than the value of the optical index of refraction of the material comprising said scintillator.

19. A high resolution radiation imager for converting incident radiation into an electrical signal corresponding to said incident radiation, the imager comprising:

a scintillator having a first surface and a second surface;

a photosensor array comprising a plurality of pixels optically coupled to said second surface of said scintillator;

an optical crosstalk attenuator optically coupled to said scintillator first surface, said crosstalk attenuator comprising at least an optical absorption material disposed so as to inhibit reflection of optical photons incident on said scintillator first surface back into said scintillator along selected crosstalk reflection paths, said selected crosstalk reflection paths being oriented such that photons passing thereon would be incident upon photosensor array pixels outside of a selected focal area corresponding to the absorption point in said scintillator of said incident radiation; and an optical screen layer optically coupled to said scintillator second surface, said optical screen layer comprising a substantially transparent material having a critical index of refraction selected so as to cause total internal reflection of optical photons within said screen layer of optical photons incident on said layer at an angle greater than a scintillator critical angle.

20. The imager of claim 19 wherein said scintillator comprises cesium iodide and said scintillator first surface comprises a plurality of columnar protrusions;

said optical crosstalk attenuator comprising a backing plate disposed over said scintillator first surface and an optical coupling layer disposed around said columnar protrusions and between said scintillator first surface and said backing plate.

21. The imager of claim 20 wherein said optical crosstalk attenuator further comprises an optical absorption material disposed over a surface of said backing plate facing said scintillator first surface.

22. The imager of claim 20 wherein said optical crosstalk attenuator further comprises an optical absorption material disposed in said optical coupling layer.

23. An apparatus in accordance with claim 20 wherein said photodiodes disposed in a respective sensor element are electrically coupled in parallel to a common electrode so as to facilitate electrical isolation of a respective diode by severance of the respective diode's connection to said common electrode.

24. The imager of claim 19 wherein said optical screen layer comprises a material selected from the group consisting of silicon oxide, magnesium fluoride, and polyimide.

* * * * *